United States Patent
Sakowicz et al.

(10) Patent No.: US 12,033,116 B1
(45) Date of Patent: Jul. 9, 2024

(54) APPARATUS AND METHOD FOR CLASSIFYING A MULTI-CHANNEL USER DATA SET TO A PROGRAM CATEGORY

(71) Applicant: Newborn Care Solutions, LLC, Paradise Valley, AZ (US)

(72) Inventors: Todd Sakowicz, Paradise Valley, AZ (US); Tonya Sakowicz, Paradise Valley, AZ (US)

(73) Assignee: Newborn Care Solutions, LLC, Scottsdale, AZ (US)

(*) Notice: Subject to any disclaimer, the term of this patent is extended or adjusted under 35 U.S.C. 154(b) by 0 days.

(21) Appl. No.: 18/085,080

(22) Filed: Dec. 20, 2022

(51) Int. Cl.
   *G06Q 10/1053* (2023.01)
   *G06V 40/20* (2022.01)

(52) U.S. Cl.
   CPC ......... *G06Q 10/1053* (2013.01); *G06V 40/23* (2022.01)

(58) Field of Classification Search
   CPC .............................. G06Q 10/105; G06V 40/23
   See application file for complete search history.

(56) References Cited

U.S. PATENT DOCUMENTS

| | | | |
|---|---|---|---|
| 11,062,411 B2 | 7/2021 | Terra | |
| 2001/0052132 A1* | 12/2001 | Fryer | G09B 5/02 434/308 |
| 2015/0206443 A1* | 7/2015 | Aylesworth | G09B 5/02 434/322 |
| 2016/0196534 A1* | 7/2016 | Jarrett | G06Q 50/2057 705/321 |
| 2018/0150739 A1* | 5/2018 | Wu | G06N 20/10 |
| 2019/0130360 A1* | 5/2019 | Wu | G06Q 50/01 |
| 2022/0270504 A1 | 8/2022 | Hu | |

(Continued)

OTHER PUBLICATIONS

Shi, Zhiwei, et al. "Learning path planning algorithm based on career goals and artificial intelligence." International Journal of Emerging Technologies in Learning (iJET) 17.10 (2022): 256-272. (Year: 2022).*

(Continued)

*Primary Examiner* — Brendan S O'Shea
(74) *Attorney, Agent, or Firm* — Caldwell Intellectual Property Law

(57) ABSTRACT

An apparatus and method for classifying a multi-channel user data set to a program category configuring the processor to receive user data by displaying a graphical user interface, the graphical user interface having at least a user input field, receiving, at the user input field, a first element of user data and capture, using a sensor, a second element of user data, wherein the second element of user data indicates a current user state, determine a user compatibility with a plurality of program category admission requirements as a function of user data utilizing a machine-learning model, wherein generating the machine-learning model comprises receiving training data, wherein the training data comprises user data inputs correlated to user compatibility outputs and determining, using the machine-learning model, as a function of the user data, the user compatibility with program category admission requirements, generate program category data for a user as a function of user data and user compatibility and generate a program category completion notification as a function of user completion data.

20 Claims, 8 Drawing Sheets

(56) References Cited

U.S. PATENT DOCUMENTS

2022/0284528 A1    9/2022  Ahmad
2023/0072902 A1*   3/2023  Riggs ............... G06Q 10/06398
2023/0080929 A1*   3/2023  Lin ....................... G06Q 50/10

OTHER PUBLICATIONS

Newton, From admissions to teaching to grading, AI is infiltrating higher education, (Webpage), Apr. 26, 2021, https://hechingerreport.org/from-admissions-to-teaching-to-grading-ai-is-infiltrating-higher-education/.

* cited by examiner

APPARATUS AND METHOD FOR CLASSIFYING A MULTI-CHANNEL USER DATA SET TO A PROGRAM CATEGORY

FIELD OF THE INVENTION

The present invention generally relates to the field of data classification. In particular, the present invention is directed to an apparatus and method for classifying a multi-channel user data set to a program category.

BACKGROUND

Data analysis and display relating to educational platforms suffers from inadequate identification protocols and inconvenient user interfaces.

SUMMARY OF THE DISCLOSURE

In an aspect, an apparatus for classifying a multi-channel user data set to a program category the apparatus including at least a processor and a memory communicatively connected to the processor, the memory containing instructions configuring the at least a processor to receive user data, wherein receiving user data further includes, displaying a graphical user interface, the graphical user interface having at least a user input field, receiving, at the at least a user input field, a first element of user data and capturing, using at least a sensor, a second element of user data, wherein the second element of user data indicates a current user state, determine user compatibility with program category admission requirements as a function of user input utilizing a machine-learning model, wherein generating the machine-learning model comprises, receiving training data, wherein the training data comprises user inputs and threshold parameter outputs; and determining, by the machine-learning model, as a function of the user data and the threshold parameters, the user compatibility with education admission requirements, generate appropriate program category data for the user; and generate program category completion notification.

In another aspect, a method for classifying a multi-channel user data set to a program, the method including, receiving, by the at least a processor, wherein receiving user data further comprises displaying a graphical user interface, the graphical user interface having at least a user input field, receiving, at the at least a user input field, a first element of user data and capturing, using at least a sensor, a second element of user data, wherein the second element of user data indicated a current user state and determining user compatibility with program category admission requirements as a function of user input utilizing a machine-learning model, wherein generating the machine-learning model includes receiving training data, wherein the training data comprises user inputs and threshold parameter outputs; and determining, by the machine-learning model, as a function of the user data and the threshold parameters, the user computability with program category admission requirements; generating appropriate program category data for the user; and generating program category completion notification.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods that classify a multi-channel user data set to a program category. Aspects of the present disclosure can be used to help users with data analysis and display relating to educational platforms. Exemplary embodiments illustrating aspects of the present disclosure are described below in the context of several specific examples.

Figure 1:
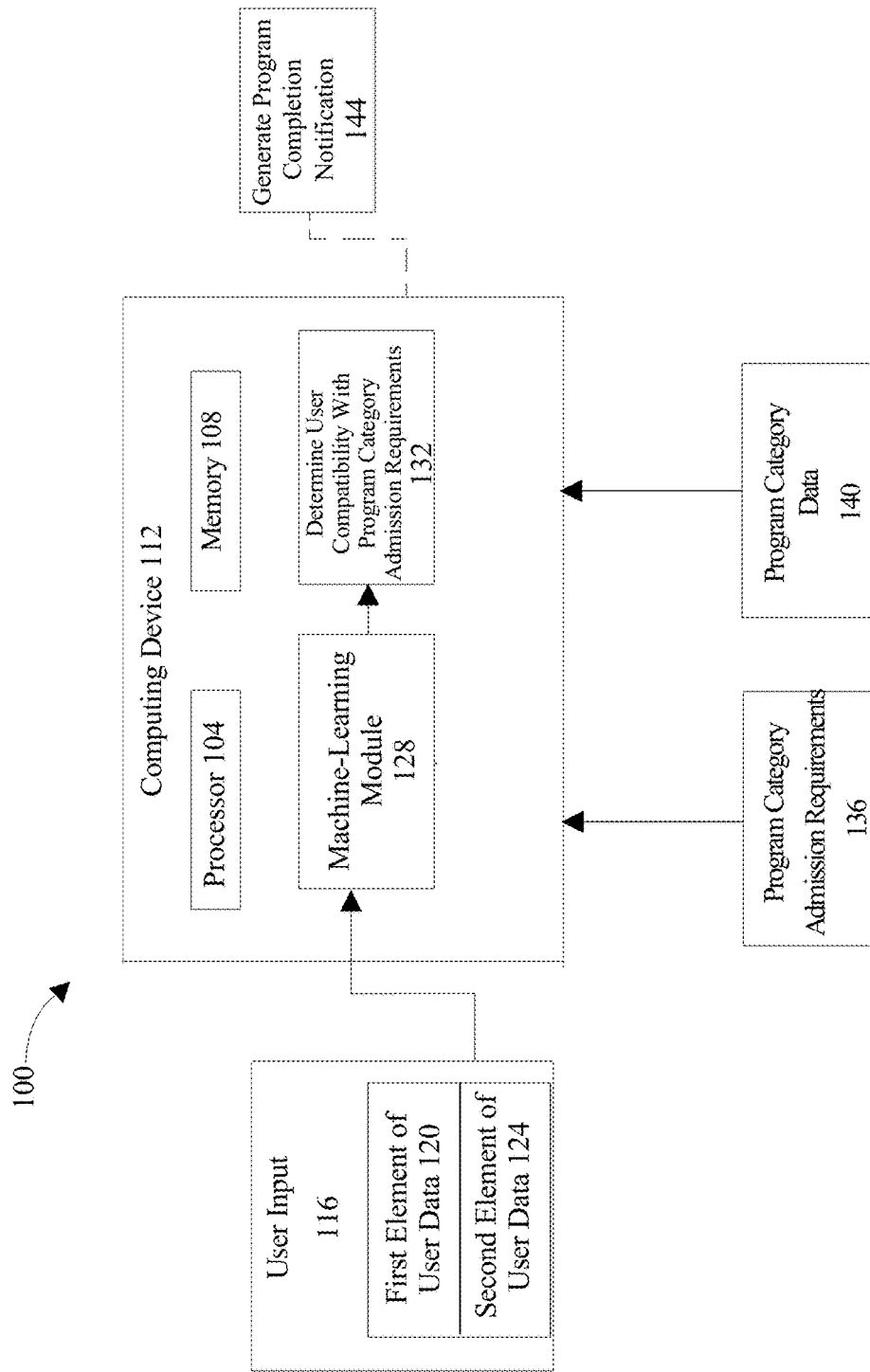
FIG. 1 is an exemplary embodiment of an apparatus for classifying a multi-channel user data set to a program category.

Referring now to FIG. 1, an exemplary embodiment of an apparatus 100 for classifying a multi-channel user data set to a program category using machine learning is illustrated. Apparatus 100 may include, be included in, and/or be a computing device 112. Computing device 112 may be designed and/or configured to perform any method, method step, or sequence of method steps in any embodiment described in this disclosure, in any order and with any degree of repetition. For instance, a computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Apparatus 100 also includes a processor 104. Processor 104 may include any processor incorporated in any computing device as described in this disclosure, including without limitation a microcontroller, microprocessor, digital signal processor (DSP) and/or system on a chip (SoC) as described in this disclosure. Processor and/or computing device may include, be included in, and/or communicate with a mobile device such as a mobile telephone or smartphone. A computing device incorporating processor 104 may include a single computing device operating independently, or may include two or more computing device operating in concert, in parallel, sequentially or the like; two or more computing devices may be included together in a single computing device or in two or more computing devices. Processor 104 and/or computing device may interface or communicate with one or more additional devices as described below in further detail via a network interface device. Network interface device may be utilized for connecting Processor 104 and/or computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A computing device including processor 104 may include but is not limited to, for example, a computing device or cluster of computing devices in a first location and a second computing device or cluster of computing devices in a second location. A computing device including processor 104 may include one or more computing devices dedicated to data storage, security, distribution of traffic for load balancing, and the like. A computing device including processor 104 may distribute one or more computing tasks as described below across a plurality of computing devices of computing device, which may operate in parallel, in series, redundantly, or in any other manner used for distribution of tasks or memory between computing devices. A computing device including processor 104 may be implemented using a "shared nothing" architecture in which data is cached at the worker, in an embodiment, this may enable scalability of apparatus 100 and/or computing device.

With continued reference to FIG. 1, processor 104 and/or computing device may be designed and/or configured to perform any method, method step, or sequence of method steps in any embodiment described in this disclosure, in any order and with any degree of repetition. For instance, processor 104 and/or computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 and/or computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 1, apparatus 100 includes a memory 108, which may be implemented in any manner suitable for a primary and/or secondary memory described in this disclosure. Memory 108 may include instructions configuring processor 104 to perform various tasks. In some embodiments, apparatus 100 may include a computing device 112, where computing device includes processor 104 and/or memory 108. Memory 108 may contain instructions configuring processor 104 to perform various tasks, as described in this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 is configured to receive a user input 116. In some embodiments, apparatus 100 may receive user input from one or more external computing devices, such as without limitation servers, desktops, smartphones, tablets, and the like. A "user input", as used in this disclosure, is a form of data entry received from an individual and/or group of individuals, such as an individual and/or group of individuals that is using and/or interacting with apparatus 100. User input 116 may include, but is not limited to, first element of user data 120. "User data" as used in this disclosure is defined as information related to a prospective student or user. Receiving first element of user data 120 may include displaying a graphical user interface with the graphical user interface having at least a user input field and receiving, at the user input field, a first element of user data. "First element of user data" may include verified and/or trusted information associated with an identify of the user, such as a personal identity or an employment identity. A "personal identity," as used in this disclosure, is personal information that can be used to identify a user. For instance, and without limitation, personal identity may include personally-identifiable information (PII) or personal data. For example, and without limitation, personal identity may include a user's name, home or other physical address, email address, telephone number, social security number, passport number, driver's license number, bank account number, photographic image, any combination thereof, and the like. First element of user data may include an employment identity of the user, where the user may be an employee of a current employer. An "employment identity," as used in this disclosure, is information related to an employment of a user with one or more employers. For example, and without limitation, employment identity may include information regarding the user's current job position, prior work experience, employment status (e.g., currently working, terminated as of a particular date or time, on leave, tenure, and the like), employment type (e.g., fulltime, part-time, temporary, intern, seasonal, and the like), and the like.

Prospective student should have at least, prior experience working with an infant in a professional setting, either as a nanny or as a daycare provider (or similar capacity), be 18 years of age and pass a math skills exam. "Program category" as used in this disclosure is defined as an online childcare/infant/newborn care education program. "Childcare" as used in this disclosure is defined as the care of children especially as a service. "Infant care" as used in this disclosure is defined as a further type of childcare, the care of infant health and development improvement services and ancillary services appropriate for a child from birth to 24 months of age. For example, an infant care worker or center, may look after, watch, protect, care for, supervise, take charge of an infant and the like. "Newborn care" as used in this disclosure is defined the care of newborns which are children under 4 weeks of age. For example, the first 4 weeks of life are a time when changes are rapid and many critical events can occur such as feeding patterns, sleeping patterns, bonding between parents and the infant, the risk for infections are higher, birth and congenital defects are first noted and the like. Newborn care is very important as a child is at the highest risk of dying during the first 4 weeks of life.

Still referring to FIG. 1, apparatus 100 may receive program category admission requirements 136 and program category data 140. Program category data 140 may include various program categories such as, without limitation, Foundational Program, Elite Program and Master Program. Each of the aforementioned programs may have unique program category admission requirements 136. "Program category admission requirements" as used in this disclosure, are the specific minimum criteria a program must use when accepting a prospective user to the program. For example, an admission requirement may include a minimum age of 18 prior to acceptance, previous childcare experience in a professional setting, math skills and the like. "Program category data" as used in this disclosure is defined as information about programs. "Program" as used in this disclosure is defined as a set of classes or a plan of study on a particular subject. Program category data may include, as non-limiting examples, program title, program schedule, program instructors, program supply materials, mode of study, qualifications and the like. For example, program admission requirements for the Foundational Program includes, but is not limited to, prior experience working with an infant in a professional setting, either as a nanny or as a daycare provider (or similar capacity), be at least 18 years of age and pass a math skills exam. The Foundational Program is advantageous for newer nannies, doulas and experienced infant daycare workers to strengthen and deepen their newborn knowledge, the program goes in depth into many areas such as recognizing possible signs of conditions such as postpartum mood disorders, torticollis, tongue tie, reflux, food allergies, brachial plexus injuries and the like. In addition, the program may teach various business basics needed to get started such as a focused resume, elevator pitch, working with agencies and the like. Upon completion of the Foundational Program, student may be designated a "Newborn Care Specialist".

Program category data 140 may include the Elite Program. The Elite program builds upon the Foundational Program and is 12 months long with monthly group newborn training, individualized personalized training, coaching, guiding and promoting as well as an annual three-day retreat to further hone newborn care skill sets. Program admission requirements for the Elite Program include, but are not limited to, the prospective student having already completed the Foundational Program, an essay, resume, statement, email or video interview and various work experience references. Upon completion of the Elite Program, student may be designated an "Elite Newborn Care Specialist".

Program category data 140 may include the Master Program. The Master Program is a one-year program and is the highest level of training and expertise available to newborn care specialists and builds on both the Foundational Program and Elite Program. Program admission requirements for the Master Program includes, but is not limited to, the prospective student having already completed both the Foundational Program and Elite Program, documentation of a minimum of three years consistent work as a newborn care specialist, establishment of two mentoring relationships, current First Aid and cardiopulmonary resuscitation (CPR) training, references, successful "exit interview" three peers in the program, completion and presentation of a final project. Upon completion of the program, student may be a designated "Master Newborn Care Specialist".

With continued reference to FIG. 1, User input 116 may include, but is not limited to text input, engagement with icons of a graphical user interface (GUI), and the like. Text input may include, without limitation, entry of characters, words, strings, symbols, and the like. In some embodiments, user input 116 may include one or more interactions with one or more elements of a graphical user interface (GUI). A "graphical user interface" as used in this disclosure is an interface including set of one or more pictorial and/or graphical icons corresponding to one or more computer actions. GUI may be configured to receive user input 116. GUI may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance, and without limitation, an event handler may be programmed to generate a pop-up window if a user double clicks on a specific icon. User input 116 may include, a manipulation of computer icons, such as, but not limited to, clicking, selecting, dragging and dropping, scrolling, and the like. In some embodiments, user input 116 may include an entry of characters and/or symbols in a user input field. A "user input field" as used in this disclosure is a portion of graphical user interface configured to receive data from an individual. A user input field may include, but is not limited to, text boxes, search fields, filtering fields, and the like. In some embodiments, user input 116 may include touch input. Touch input may include, but is not limited to, single taps, double taps, triple taps, long presses, swiping gestures, and the like. In some embodiments, GUI may be displayed on, without limitation, monitors, smartphones, tablets, vehicle displays, and the like. Vehicle displays may include, without limitation, monitors and/or systems in a vehicle such as multimedia centers, digital cockpits, entertainment systems, and the like. One of ordinary skill in the art upon reading this disclosure will appreciate the various ways a user may interact with graphical user interface.

Still referencing FIG. 1, apparatus 100 includes capturing, using at least a sensor, a second element of user data, wherein the second element of user data indicates a current user state. A "current user state" as used in this disclosure is defined as data, such as without limitation data provided by a user, that describes a present user activity indicative of a current emotional condition, a current behavioral or emotional user state, and/or body language as described in further detail below.

With continued reference to FIG. 1, apparatus 100 may be configured to receive and/or determine user's behavioral or emotional state and body language through data extracted from audio and/or visual components of a skill evaluation. Apparatus 100 may determine an image component of a skill evaluation. As used in this disclosure, an "image component" is a visual representation. An image component may include animations, still imagery, recorded video, and the like. An image component may include visual information of a skill evaluation. In some cases, an image component may include a plurality of temporally sequential frames. In some cases, each frame may be encoded (e.g., bitmap or vector-based encoding). Each frame may be configured to be displayed by way of a display. Exemplary displays include without limitation light emitting diode (LED) displays, cathode ray tube (CRT) displays, liquid crystal displays (LCDs), organic LEDs (OLDs), quantum dot displays, projectors (e.g., scanned light projectors), and the like. In some cases, an image component may digitally represent (i.e., encode) visual information, for instance a pixel (luma and/or chroma) mapping.

With continued reference to FIG. 1, a skill evaluation may include an audio component. As used in this disclosure, an "audio component" is a representation of audio, for example a sound, a speech, and the like. In some cases, an audio component may be represented digitally. In some cases, an audio component may be temporally associated with an image component video. For example, in some cases, an audio component may be synchronized with an image component. An audio component may be compressed and/or encoded, for example by way of a digital audio coding format (i.e., codec). Exemplary audio codecs include without limitation free lossless audio codec (FLAC), MPEG-4 audio lossless coding, Dolby digital, MP3, Vorbis, and the like. In some cases, an audio codec may be lossless. Alternatively or additionally, in some cases, an audio codec may be lossy.

With continued reference to FIG. 1, a skill evaluation may include, for example by way of representation with one or both of an image component and audio component, verbal content. As used in this disclosure, "verbal content" is comprehensible language-based communication. For example, in some cases, verbal content may include visual verbal content. As used in this disclosure, "visual verbal content" is literal (e.g., written) verbal content. In some cases, visual verbal content may be included within a skill evaluation substantially by way of an image component. Alternatively or additionally, in some cases, verbal content may include audible verbal content. As used in this disclosure, "audible verbal content" is oral (e.g., spoken) verbal content. In some cases, audible verbal content may be included within a skill evaluation substantially by way of an audio component.

Still referring to FIG. 1, in some embodiments, a skill evaluation may include, for example by way of representation with one or both of an image component and audio component, non-verbal content. As used in this disclosure, "non-verbal content" is all communication that is not characterized as verbal content. As such, non-verbal content includes all subtle (and non-subtle) forms of communication which are not conveyed with use of language. Exemplary non-verbal content may include change in intonation and/or stress in a speakers voice, expression of emotion, interjection, and the like. For example, in some cases, non-verbal content may include visual non-verbal content. As used in this disclosure, "visual non-verbal content" is non-verbal content that is visually represented. In some cases, visual non-verbal content may be included within a skill evaluation substantially by way of an image component. Alternatively or additionally, in some cases, non-verbal content may include audible non-verbal content. As used in this disclosure, "visual non-verbal content" is non-verbal content that is audibly represented. In some cases, audible non-verbal content may be included in a skill evaluation substantially by way of an audio component. A skill evaluation may be representative of a form of a user-specific data. As used in this disclosure, "user-specific data" is any element of information that is associated with a specific user. Exemplary forms of user-specific data include an image component, audio component, verbal content, non-verbal content, solicitation video, as well as any information derived directly or indirectly from a skill evaluation or any other user-specific data. In some cases, user-specific data may represent attributes associated with a specific user. In some cases, a non-verbal classifier may classify non-verbal content present in one or more audio components and/or image components to one or more of a posting, feature, keyword, and the like. A non-verbal classifier may include a number of classifiers, for example each being tasked with classifying a particular attribute or form of non-verbal content. For example, in some cases, a non-verbal classifier may classify a skill evaluation and related user as associated with a feature or keyword representative of 'personable.' A non-verbal classifier may include a specialized audible non-verbal classifier to classify audible non-verbal content within an audio component as sounding 'personable' that is, for example, as having appropriate levels of intonation, timber, melody, stress, and the like. Likewise, a non-verbal classifier may include another specialized visual non-verbal classifier to classify visual non-verbal content as appearing 'personable' that is, for example, as having appropriate posture, facial expressions, manner of dress, and the like. In some cases, a classifier may include or a constituent part of tree structure, for making associations based upon a skill evaluation The non-verbal classifier may be generated using a training data set. Training data set may include second element of user data as an input correlated to user state training data. Training data may include inputs correlated to inputs. The non-verbal classifier may be generated by a classification algorithm which may include generating a K-nearest neighbor (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, computing device 112 is configured to receive a second element of user data 124 from a user to generate current user state. As defined in this disclosure, current user state data is data provided by the user that describes a present user activity indicative of a current emotional condition; a "present" and/or "current" activity and/or emotional state, as used in this disclosure, is an activity and/or emotional state that is occurring at or near a time at which computing device receives second element of user data, such as an emotional state of a user that is still extant after transmission of current user state data to computing device 112. For example, current user state may be worried due to a depiction of user with a frowned expression and stress in user's voice. "Emotional state" as used in this disclosure is defined as the state of a person's emotions. Current user state may also include body language. "Body language" as used in this disclosure is defined as the process of communicating nonverbally through conscious or unconscious gestures and movements. For example, sad body language may include user's eyes and head to be lowered with hunched posture and a drooping mouth. Data describing the state of person's emotion may include body posture and facial expression, for example, a video depicting the user smiling and standing in a straight manner. Examples of second element of user data may include, but are not limited to, data characterizing and/or describing a feeling such as happy or sad; a picture showing, for example, a picture of an event or a person that triggers an emotion in a user; a song or any audio file that triggers a memory in a user, or the like. User may use, for example, a user client device such as a smartphone to transmit current user state data to the computer device 112; transmission may alternatively or additionally occur automatically. Any device that integrates communication functions such as voice calling, and Internet access may be examples of a user client device that a user may use to transmit current user state data.

Still referring to FIG. 1, apparatus 100 may capture the second element of user data using a sensor. A sensor may include any electromagnetic sensor, including without limitation electroencephalographic sensors, magnetoencephalographic sensors, electrocardiographic sensors, electromyographic sensors, or the like. A sensor may include a temperature sensor. A sensor may include any sensor that may be included in a mobile device and/or wearable device, including without limitation a motion sensor such as an inertial measurement unit (IMU), one or more accelerometers, one or more gyroscopes, one or more magnetometers, or the like. At least a wearable and/or mobile device sensor may capture step, gait, and/or other mobility data, as well as data describing activity levels and/or physical fitness. At least a wearable and/or mobile device sensor may detect heart rate or the like. A sensor may detect any hematological parameter including blood oxygen level, pulse rate, heart rate, pulse rhythm, blood sugar, and/or blood pressure. A sensor may be a part of system 100 or may be a separate device in communication with apparatus 100.

Still referring to FIG. 1, processor 104 may be configured to determining a current user state as a function of second element of user data 124. In some embodiments, determining a current user state may include utilizing a user state machine-learning model, wherein utilizing the user state machine-learning model includes receiving user state training data, wherein the training data comprises second element of user data inputs and threshold parameter outputs; and determining, by the user state machine learning model, as a function of the second element of user data and the threshold parameters, the current user state. "Threshold parameters" as used in this disclosure are defined as the various degrees or tolerances and/or thresholds of current user state. For example, with continued reference to FIG. 1, apparatus 100 may include a user database. User database may be populated with one or more relationships between labels, objects, themes, or the like, as introduced in further detail below, and problematic behaviors and/or negative behavioral propensities; such relationships may be entered in user database by users, where user entry may include entry by one or more expert users "crowd-sourced" entry by large numbers of users, which may be aggregated, or the like. Where user entries are aggregated, aggregated results may include comparison of aggregated values to threshold numbers; for instance, a relationship between a given label and a problematic behavior and/or negative behavioral propensity may be recorded where more than a threshold percentage of user entries have identified the two as linked. Such data and/or relationships or correlations therebetween, may be used for training examples and any such relationship may be used to train a machine learning model that inputs a type of data and outputs a second type of data as trained by relationships. In an embodiment, a threshold machine learning-model may be utilized to compare current user states to a predetermined standard. Utilizing the threshold machine-learning model includes receiving current user state training data and a predetermined standard as an input and wherein the training data includes whether or not the current user state falls within the predetermined standard, outputs may be listed within a degree or tolerance and/or threshold of current user state. This may be implemented by inputting multiple potentially subjective determinations related to constraints/thresholds which are represented as fuzzy sets and get output a probability distribution indicating likelihood that the compliance will be under the threshold, a degree to which it is over or under or a yes/no determination which is described in more detail in FIG. 6 and below.

Machine learning algorithms may include unsupervised machine learning algorithms such as clustering models, k-means clustering, hierarchical clustering, anomaly detection, local outlier factor, neural networks and the like. Machine-learning may include supervised machine learning algorithms using second element of user data 120. Machine-learning algorithms may include lazy-learning. Machine-learning algorithm may include one or more neural networks such as convolutional and/or deep learning networks and are discussed more herein with reference to FIG. 4.

Continuing to reference FIG. 1, processor 104 is configured to determine user compatibility with program category admission requirements using a machine-learning module 128 as a function of program category admission requirements 136 and program category data 140. "User compatibility" as used in this disclosure is defined as the alignment of user's input to program category admission requirements 136. Processor 104 is configured to generate the machine-learning model by receiving training data, wherein the training data includes user data inputs correlated to user compatibility outputs; and determining, using the machine-learning model, as a function of the user data, the user compatibility with program category admission requirements 132. Machine learning module 128 may be supervised and may be trained with training data. Training data may include a database of user data and program category admission requirements and program category data. Machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language. In one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, such as any database described in this disclosure. In other embodiments, machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Data may include previous outputs such that machine learning module 128 iteratively produces outputs, thus creating a feedback loop. For example, an input may include the user data and an output may include a determination of user compatibility with education admission requirements.

Continuing to reference FIG. 1, apparatus 100 may be configured to generate appropriate program category data 140 for a user as a function of user data and user compatibility. For example, computing device 112 may rank user data and user compatibility based on an objective function. An "objective function," as used in this disclosure, is a mathematical function used by computing device 112 to score a quantitative element or factor which may include, for example, any request parameter. In various embodiments a score of a particular factor may be based on a combination of one or more factors. Each factor may be assigned a score based on predetermined variables, for example, a knowledge parameter may be scored higher than a work experience parameter or ability parameter. Additionally or alternatively, in some embodiments, the assigned scores may be weighted or unweighted. Computing device 112 may compute a score associated with each factor and select factors to minimize and/or maximize the score, depending on whether an optimal result is represented, respectively, by a minimal and/or maximal score. Objective function may be formulated as a linear objective function, which computing device 112 may solve using a linear program such as without limitation a mixed-integer program. A "linear program," as used in this disclosure, is a program that optimizes a linear objective function, given at least a constraint. In various embodiments, apparatus 100 may determine scores that maximize a total score subject to at least a constraint. An objective function may then be optimized to generate a personalized curriculum or program category data customized to a user's knowledge. Computing device 112 may calculate a change in the knowledge, competency, or ability of a user. For example, user may have already completed the Foundational Program and apparatus may generate appropriate training classes related to the Elite Program and the like.

Still referencing FIG. 1, apparatus 100 may be configured to generate program completion notification 144 as a function of user completion data. For example, processor 104 may generate completion notification indicators by utilizing one or more algorithms or generating one or more machine-learning modules, such as indicator module. Indicator module may also determine a weight of indicators. Indicator module may include utilizing a classifier and/or a machine-learning model as discussed below in reference to FIG. 3. In one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user. In other embodiments, machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Indicator module may be generated using training data, such as indicator data. Indicator module may be trained by the correlated inputs and outputs of indicator data. Inputs of indicator data may include program completion data. Outputs of training data may include program completion notification data corresponding to the inputs. Indicator data may be program category completion and corresponding indicators that have already been determined whether manually, by machine, or any other method. Indicator data may be gathered from supervisor feedback. Indicator data may include previous outputs such that indicator module iteratively produces outputs, thus creating a feedback loop. Indicator module using a machine-learning process may output indicators based on input and indicator data. In some embodiments, indicators may be weighted and/or ranked according to the importance of the indicators. For example, a user's math skills grades may be less of a predicting factor than amount of work experience for whether the user will likely get a program completion notification. Indicator module may be configured to output indicators that are weighted and/or ranked based on weighted and/or ranked indicators as outputs in indicator data. In some embodiments, indicators may be weighted and/or ranked based on training data. For example, once user has completed the Master Program, they may receive a category completion notification consisting of "Master Newborn Care Specialist". User may now be eligible to apply to The Council for Awards in Care, Health and Education (CACHE) accreditation. Program completion notification 144 may be displayed to a user on a graphical user interface (GUI) and the like. A "graphical user interface (GUI)" is a visual way of interacting with a computer using items such as windows, icons, and menus, used by most modern operating systems. Graphical user interface and user input device may be the same device or separate devices based on their separate functions described herein.

Figure 2:
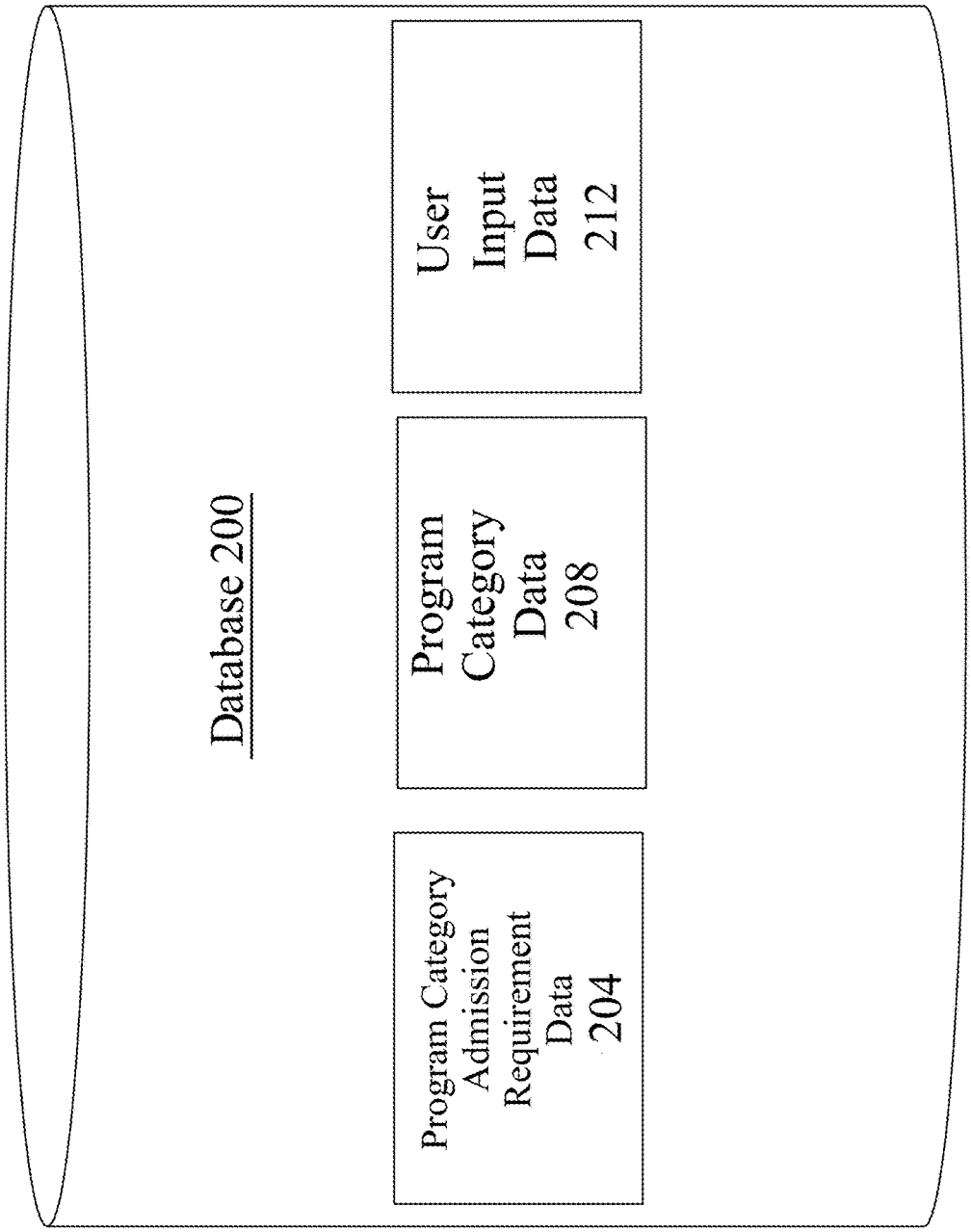
FIG. 2 is a diagram of an exemplary embodiment of a database.

Now referencing FIG. 2, an illustration of an exemplary embodiment of a database 200 is presented. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 2, in some embodiments, database 200 may include program admission requirement data 204. Program admission requirement data 204 may include, without limitation, minimum acceptable age of user, previous work history in the childcare field, math skills and the like. Database 200 may also include program category data 208. "Work history" as used in this disclosure is defined as data describing previous job experience, information about user's past employers and/or companies they have worked for, job titles and positions held, date of employment and the like. Work history may include prior childcare experience. "Childcare experience" as used in this disclosure is defined as previous work with children and gained skills and abilities related to childcare, for example through working a nursery or daycare. Program category data 208 may include, without limitation information about programs including program title, program schedule, program instructors, program supply materials, mode of study and qualifications. Database 200 may also include user input data 212. User input data 212 may include, without limitation, verified and/or trusted information associated with an identify of the user, such as a personal identity or an employment identity. Any and all determinations described above may be performed and analyzed using an optimization program.

Figure 3:
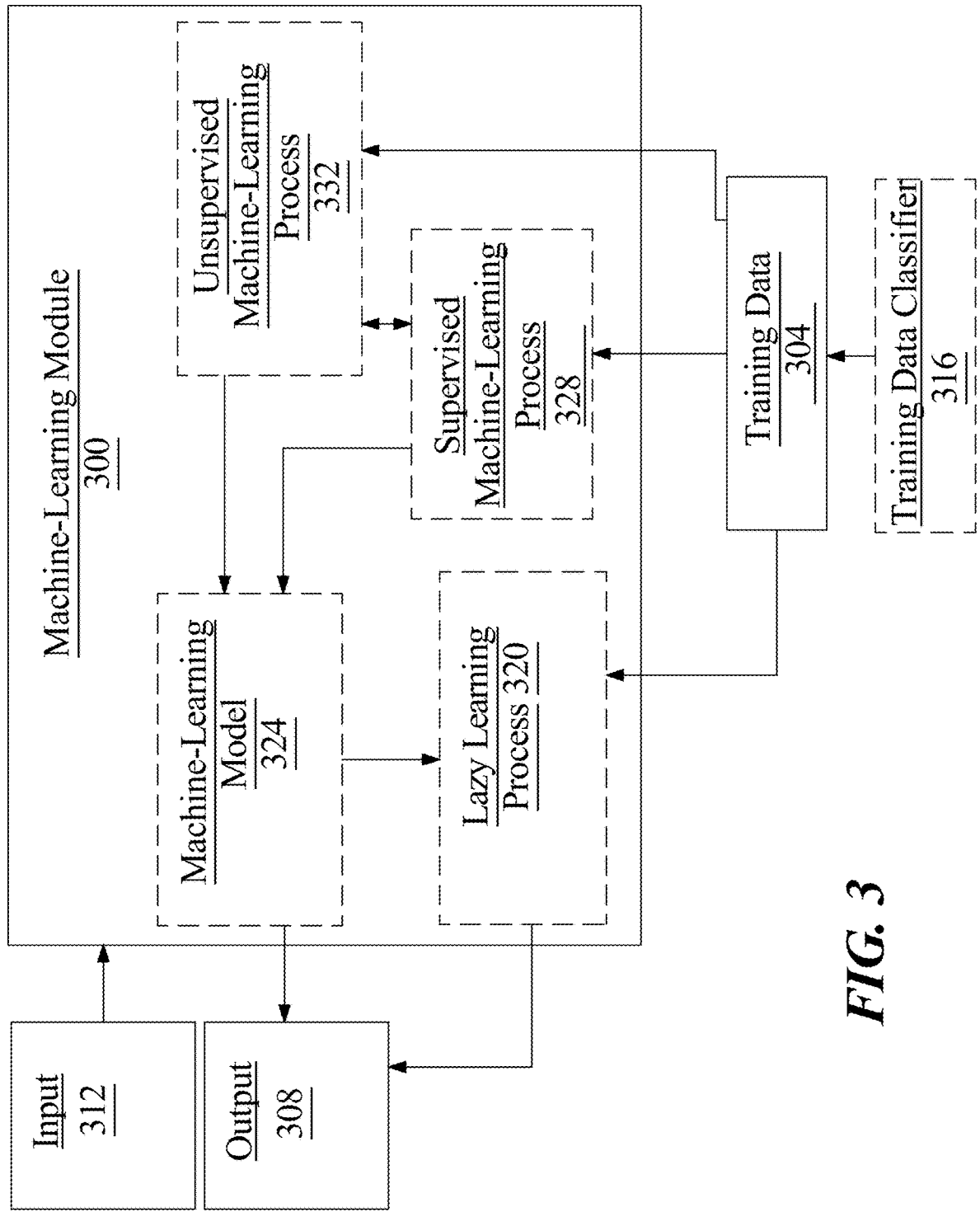
FIG. 3 is a diagram of an exemplary embodiment of a machine-learning module.

Referring now to FIG. 3, a diagram of an exemplary embodiment of a machine-learning module is presented. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 5304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
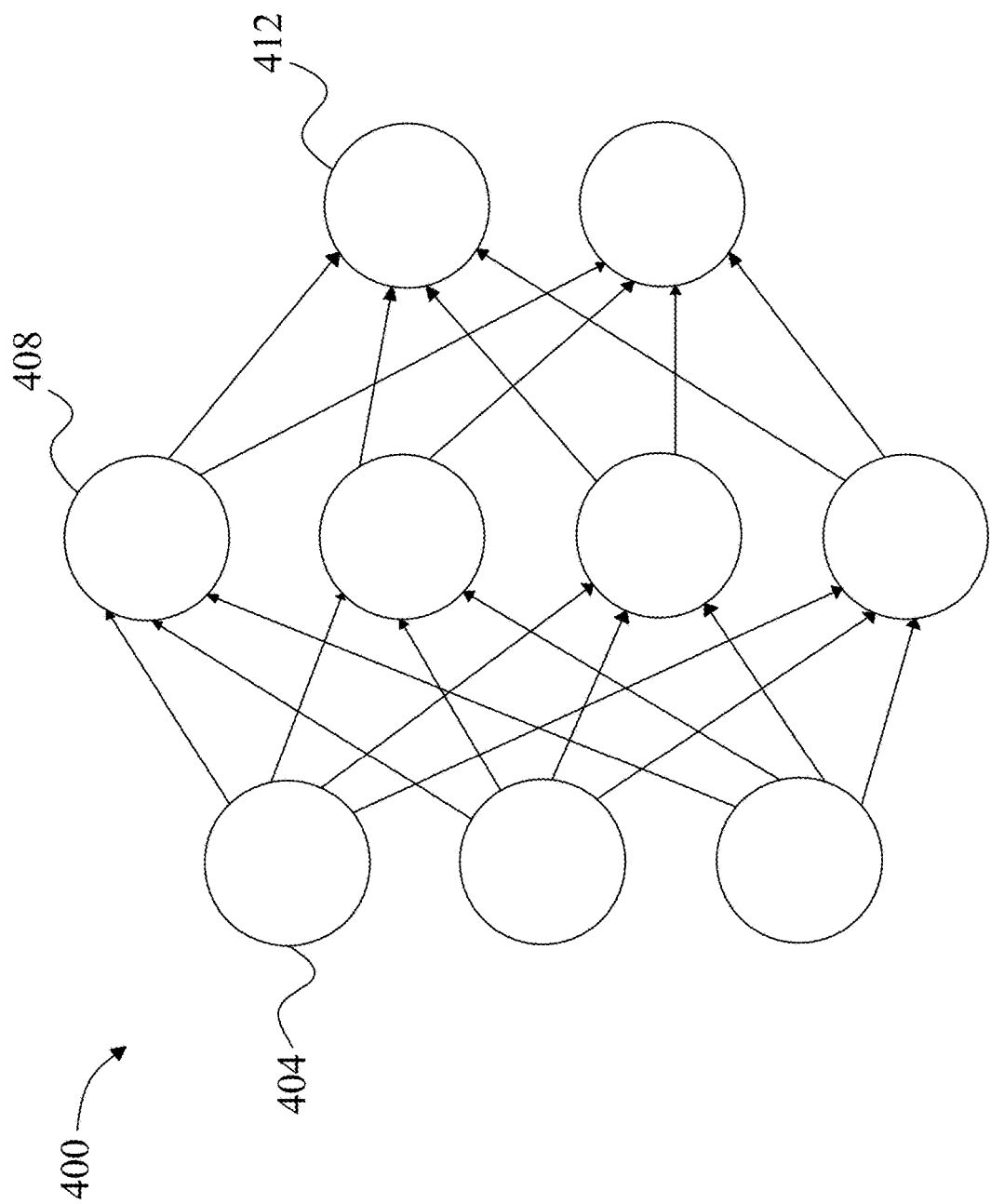
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
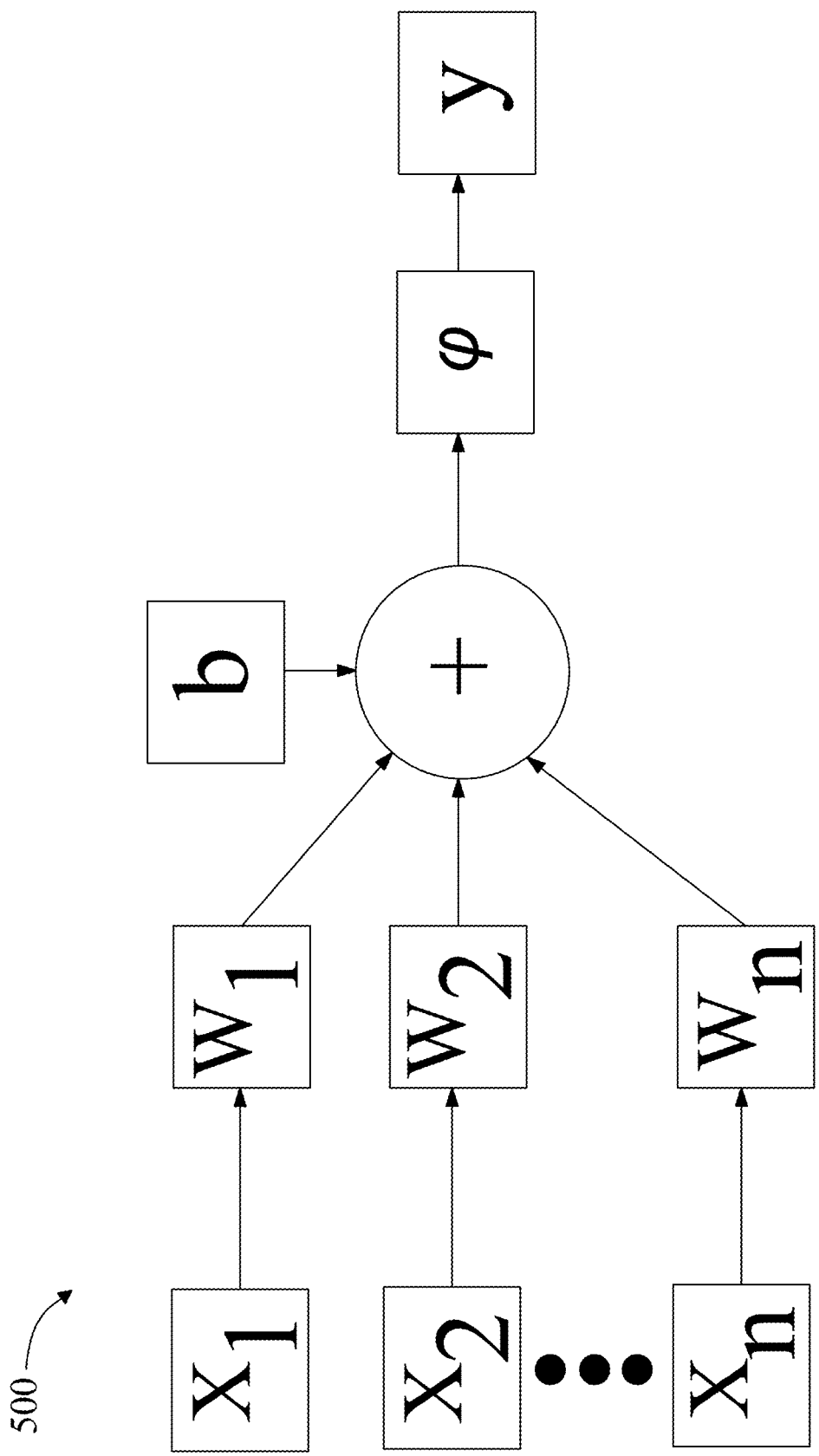
FIG. 5 is a diagram of an exemplary embodiment of a node of a neural network.

Referring now to FIG. 5, an exemplary embodiment 500 of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
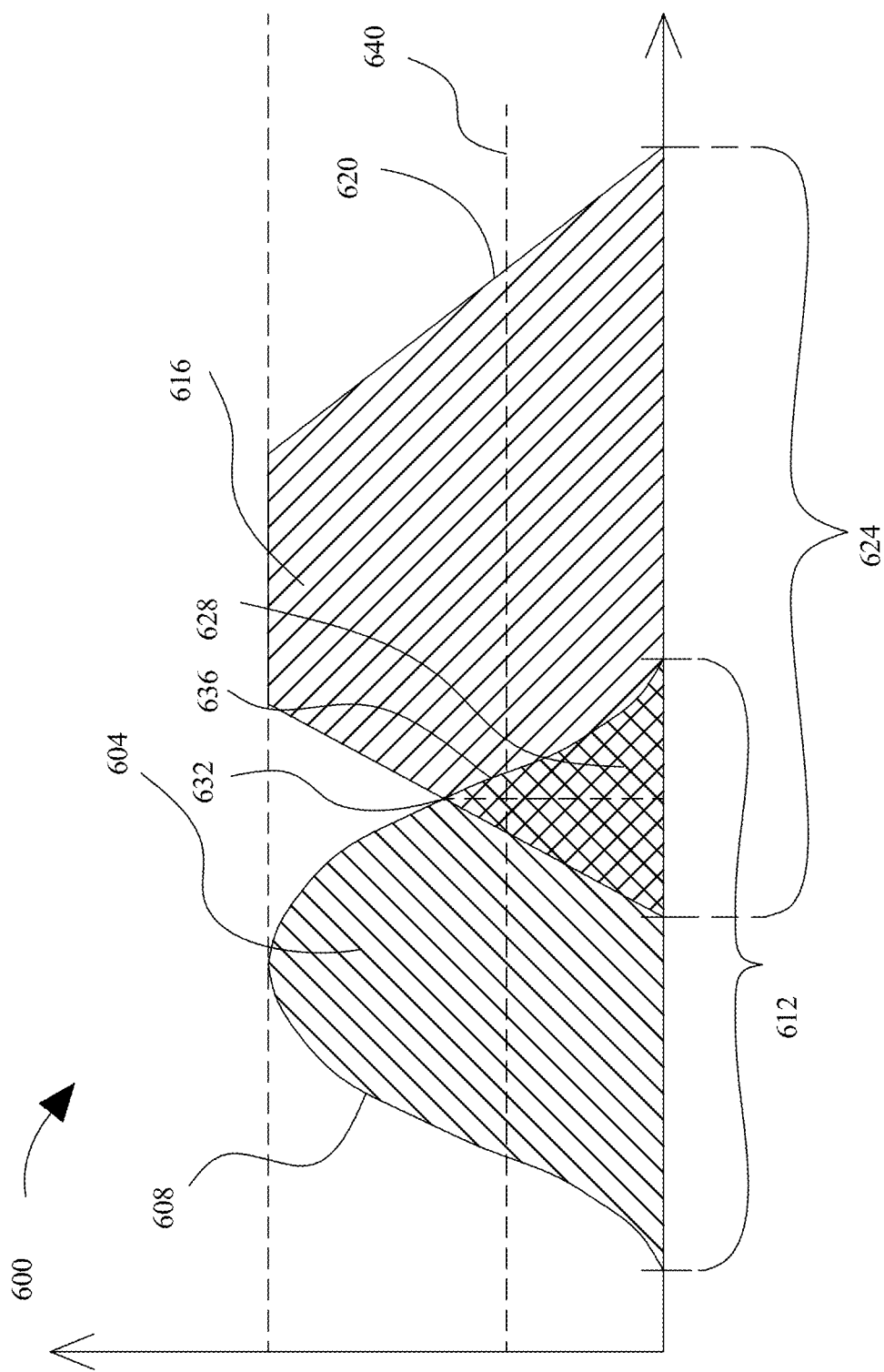
FIG. 6 is a diagram of an exemplary embodiment of a fuzzy set comparison.

Referring to FIG. 6, an exemplary embodiment of fuzzy set comparison 600 is illustrated. This system may be implemented by inputting multiple potentially subjective determinations related to constraints which are represented as fuzzy sets and get output a probability distribution indicating likelihood that the compliance will be under the threshold, a degree to which it is over or under or a yes/no determination. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 804. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and a predetermined class, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to determine user compatibility with program category admission requirements based on input data such as the user input. Where multiple fuzzy matches are performed, degrees of match for each respective fuzzy set may be computed and aggregated through, for instance, addition, averaging, or the like, to determine an overall degree of match.

Still referring to FIG. 6, a computing device may use a logic comparison program, such as, but not limited to, a fuzzy logic model to determine a score. A score may include, but is not limited to, amateur, average, knowledgeable, superior, and the like; each such score may be represented as a value for a linguistic variable representing score, or in other words a fuzzy set as described above that corresponds to a degree of similarity as calculated using any statistical, machine-learning, or other method that may occur to a person skilled in the art upon reviewing the entirety of this disclosure. In some embodiments, determining a score may include using a linear regression model. A linear regression model may include a machine learning model. A linear regression model may be configured to map data of threshold elements to one or more scores. A score classification model may be configured to input collected data and cluster data to a centroid based on, but not limited to, frequency of appearance, and the like. Centroids may include scores assigned to them such that elements of the threshold may each be assigned a score. In some embodiments, and score classification model may include a K-means clustering model. In some embodiments, and score classification model may include a particle swarm optimization model. A fuzzy inference engine may be configured to map one or threshold elements using fuzzy logic. In some embodiments, a plurality of entity assessment devices may be arranged by a logic comparison program into score arrangements. An "score arrangement" as used in this disclosure is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given score level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to a degree of similarity, while a second membership function may indicate a degree of similarity of a subject thereof, or another measurable value. Continuing the example, an output linguistic variable may represent, without limitation, a score value. An inference engine may combine rules, such as: "if the difficulty level is 'hard' and the popularity level is 'high', the question score is 'high' the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
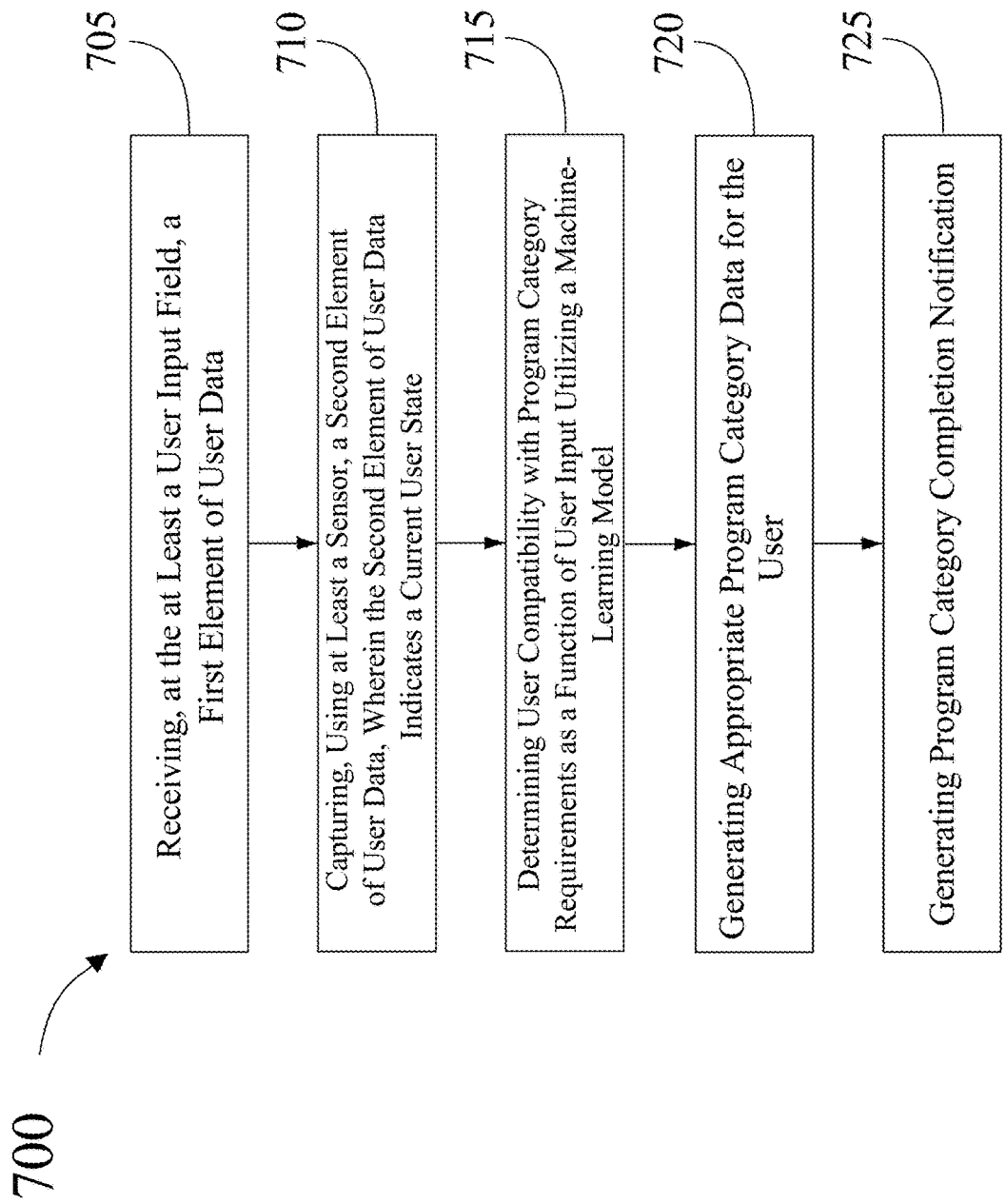
FIG. 7 is a flowchart of a method for classifying a multi-channel user data set to a program category.

Referring now to FIG. 7, a method 700 of using an apparatus for classifying a multi-channel user data set to a program category. At step 705, method 700 includes receiving, at the at least a user input field, a first element of user data. User data may be received through user input, from external computing devices, such as a remote device, and the like. This step may be implemented as described above in FIGS. 1-6, without limitation.

Still referring to FIG. 7, at step 710, method 700 includes capturing, using at least a sensor, a second elements of user data, wherein the second element of user data indicates a current user state. This step may be implemented as described above in FIGS. 1-6, without limitation.

Still referring to FIG. 7, at step 715, method 700 includes determining user compatibility with program category requirements as a function of user input utilizing a machine-learning model. This step may be implemented as described above in FIGS. 1-6, without limitation.

Still referring to FIG. 7, at step 720, method 700 includes generating appropriate program category data for the user. This step may be implemented as described above in FIGS. 1-6, without limitation.

Still referring to FIG. 7, at step 725, method 700 includes generating program category completion notification. This step may be implemented as described above in FIGS. 1-6, without limitation.

Figure 8:
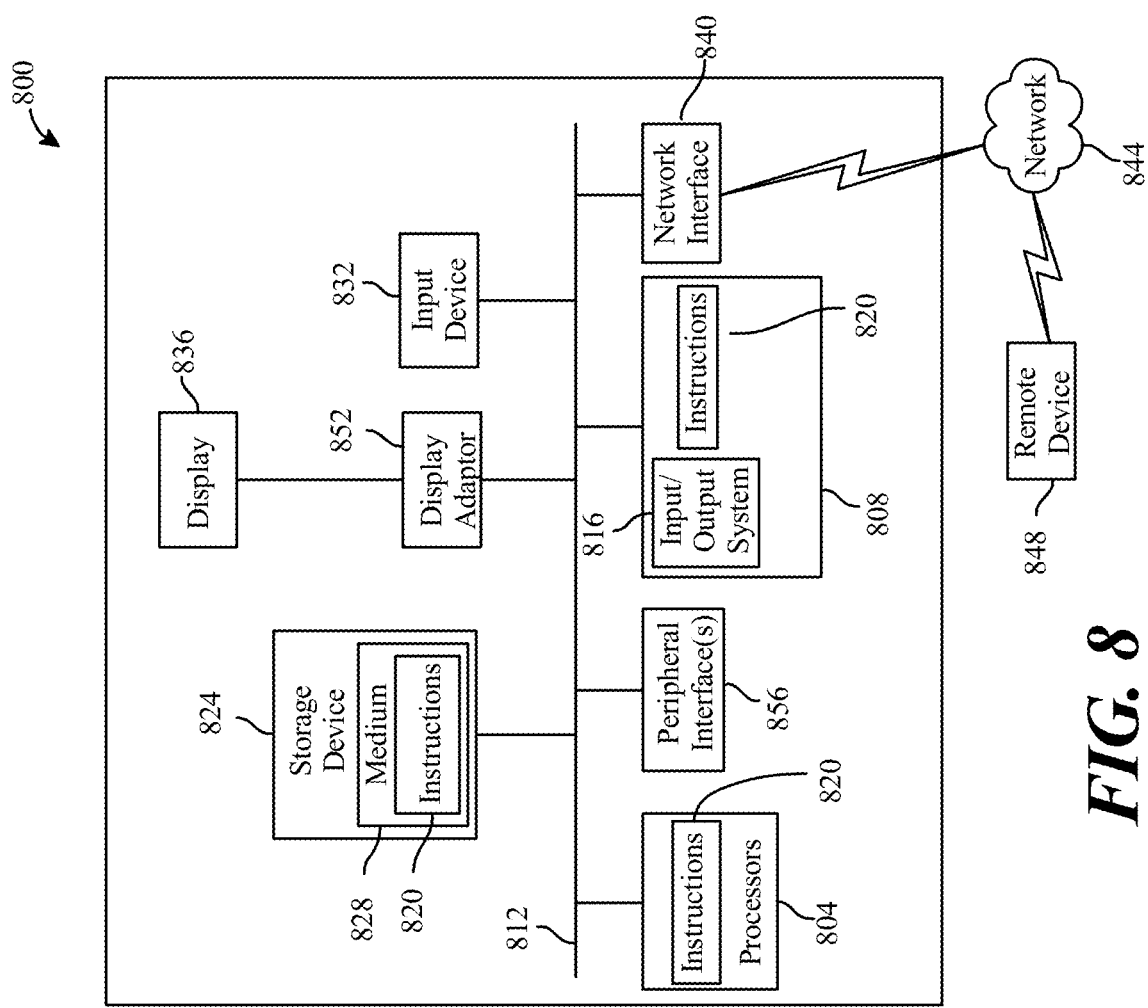
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components hereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for classifying a multi-channel user data set to a program category, the apparatus comprising:
at least a processor; and
a memory communicatively connected to the at least a processor, the memory containing instructions configuring the at least a processor to:
receive user data, wherein receiving the user data further comprises:
displaying a graphical user interface, the graphical user interface having at least a user input field; and
receiving, at the at least a user input field, a first element of the user data;
capture, using at least a sensor, a second element of the user data, wherein the second element of the user data comprises an audio file and a video, and wherein the second element of the user data indicates a current user state;
determine a user compatibility with a plurality of program category admission requirements comprising having a prior professional childcare history and passing a math skills test as a function of the user data utilizing a machine-learning model, wherein utilizing the machine-learning model comprises:
receiving training data, wherein the training data comprises user data inputs correlated to user compatibility outputs and previous user compatibility outputs such that the machine-learning model iteratively produces outputs to create a loop; and
determining, using the machine-learning model, as a function of the user data, the user compatibility with program category admission requirements;
generate program category data for a user as a function of the user data and the user compatibility, wherein the program category data comprises a plurality of program categories comprising one or more of online childcare, online infant care and online newborn care education programs, wherein the plurality of program categories includes a first level program category and a second level program category, wherein the user is required to complete the first level program category in order to enroll in a next level of program category, and wherein:

completion of the first level program category comprises completion by the user of a preliminary childcare education curriculum;

entry into the second level program category requires completion of the first level by the user; and completion of the second level program category comprises completion by the user of an advanced childcare education curriculum; and generate a program category completion notification as a function of the user compatibility and the program category data.

2. The apparatus of claim 1, wherein the first element of the user data comprises a work history of the user.

3. The apparatus of claim 2, wherein capturing the second element of the user data comprises utilizing a user state machine-learning model, wherein utilizing the user state machine-learning model comprises:

receiving user state training data, wherein the user state training data comprises second element of user data inputs and threshold parameter outputs; and determining, by the user state machine learning model, as a function of the second element of the user data and the threshold parameter outputs, the current user state.

4. The apparatus of claim 3, wherein the current user state comprises a body language and an emotional state of the user.

5. The apparatus of claim 3, wherein the memory contains instructions further configuring the at least a processor to perform natural language processing on the second element of the user data.

6. The apparatus of claim 2, wherein the work history comprises prior childcare experience.

7. The apparatus of claim 1, wherein the first element of the user data comprises an age of the user.

8. The apparatus of claim 1, wherein the program category is updated as a function of updated threshold parameters.

9. The apparatus of claim 1, wherein generation of the program completion notification utilizes a second machine-learning model.

10. The apparatus of claim 1, wherein the user data comprises image data and video data.

11. A method for classifying a multi-channel user data set to a program category, the method comprising:

receiving, by at least a processor, user data, wherein receiving the user data further comprises:

displaying, by the at least a processor, a graphical user interface, the graphical user interface having at least a user input field; and receiving, by the at least a processor, at the at least a user input field, a first element of the user data;

capturing, using at least a sensor, a second element of the user data, wherein the second element of the user data comprises an audio file and a video, and wherein the second element of the user data indicates a current user state;

determining, by the at least a processor, a user compatibility with a plurality of program category admission requirements comprising having a prior professional childcare history and passing a math skills test as a function of the user data utilizing a machine-learning model, wherein utilizing the machine-learning model comprises:

receiving training data, wherein the training data comprises user data inputs correlated to user compatibility outputs and previous user compatibility outputs such that the machine-learning model iteratively produces outputs to create a loop; and determining, using the machine-learning model, as a function of the user data, the user compatibility with education admission requirements;

generating program category data for a user as a function of the user data and the user compatibility, wherein the program category data comprises a plurality of program categories comprising one or more of online childcare, online infant care and online newborn care education programs wherein the plurality of program categories includes a first level program category and a second level program category, wherein the user is required to complete the first level program category in order to enroll in a next level of program category, and wherein:

completion of the first level program category comprises completion by the user of a preliminary childcare education curriculum;

entry into the second level program category requires completion of the first level by the user; and completion of the second level program category comprises completion by the user of an advanced childcare education curriculum; and generating a program category completion notification as a function of the user compatibility and the program category data.

12. The method of claim 11, wherein the first element of the user data comprises a work history of the user.

13. The method of claim 12, wherein the work history comprises prior childcare experience.

14. The method of claim 11, wherein capturing the second element of the user data comprises utilizing a user state machine-learning model, wherein utilizing the user state machine-learning model comprises:

receiving user state training data, wherein the user state training data comprises second element of user data inputs and threshold parameter outputs; and determining, by the user state machine learning model, as a function of the second element of the user data and threshold parameter outputs, the current user state.

15. The method of claim 14, wherein the current user state comprises a body language and emotional state of the user.

16. The method of claim 14, wherein the at least a processor is configured to perform natural language processing on the second element of the user data.

17. The method of claim 14, wherein the program category is updated as a function of updated threshold parameters.

18. The method of claim 11, wherein the first element of the user data comprises an age of the user.

19. The method of claim 11, wherein generation of the program completion notification utilizes a second machine-learning model.

20. The method of claim 11, wherein the user data comprises image data and video data.

* * * * *